US011997246B2

(12) United States Patent
Babiloni et al.

(10) Patent No.: US 11,997,246 B2
(45) Date of Patent: May 28, 2024

(54) TRAINED ARTIFICIAL INTELLIGENCE MODEL FOR RAW TO RGB IMAGE TRANSFORMATION

(71) Applicant: HUAWEI TECHNOLOGIES CO., LTD., Guangdong (CN)

(72) Inventors: Francesca Babiloni, London (GB); Ioannis Marras, London (GB); Ales Leonardis, London (GB); Gregory Slabaugh, London (GB)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 162 days.

(21) Appl. No.: 17/721,425

(22) Filed: Apr. 15, 2022

(65) Prior Publication Data
US 2022/0247889 A1 Aug. 4, 2022

Related U.S. Application Data

(63) Continuation of application No. PCT/EP2019/078332, filed on Oct. 18, 2019.

(51) Int. Cl.
*H04N 1/64* (2006.01)
*G06T 3/4015* (2024.01)

(52) U.S. Cl.
CPC .......... *H04N 1/646* (2013.01); *G06T 3/4015* (2013.01)

(58) Field of Classification Search
CPC .......... H04N 1/646; H04N 1/648; H04N 1/64; H04N 9/646; H04N 9/67; H04N 19/186; H04N 19/85; G06T 3/4015
See application file for complete search history.

(56) References Cited

U.S. PATENT DOCUMENTS

| | | | | |
|---|---|---|---|---|
| 5,546,195 | A * | 8/1996 | Arai | H04N 1/6088 358/518 |
| 6,392,699 | B1 | 5/2002 | Acharya | |
| 2007/0286287 | A1* | 12/2007 | Kim | H04N 19/86 375/E7.193 |
| 2016/0133011 | A1 | 5/2016 | Nakajima | |
| 2019/0273948 | A1 | 9/2019 | Yin et al. | |

(Continued)

FOREIGN PATENT DOCUMENTS

| | | |
|---|---|---|
| CN | 109274950 A | 1/2019 |
| CN | 110288515 A | 9/2019 |
| EP | 2426639 B1 | 9/2015 |

(Continued)

OTHER PUBLICATIONS

Chinese Office Action dated Sep. 21, 2022 for Application No. 201980101445, 6 pages.

(Continued)

*Primary Examiner* — Christopher Wait (57) ABSTRACT

An image processor comprising a plurality of processing modules configured to transform a raw image into an output image. The plurality of processing modules comprise a first module and a second module, each of which implements a respective trained artificial intelligence model. The first module is configured to implement an image transformation operation that recovers luminance from the raw image. The second module is configured to implement an image transformation operation that recovers chrominance from the raw image.

20 Claims, 11 Drawing Sheets

(56) References Cited

U.S. PATENT DOCUMENTS

2022/0036523 A1* 2/2022 Moran .................... G06T 5/009
2022/0108424 A1* 4/2022 Gan ........................ G06N 3/08

FOREIGN PATENT DOCUMENTS

JP          H06261207 A      9/1994
WO          2019079398 A1    4/2019

OTHER PUBLICATIONS

Zhi Chuan et al.,"Research on color space transformation model between RGB and L*a*b*based on BP neural network",2008 International Conference on Computer Science and Software Engineering, total: 3 pages.

Kede Ma et al., "Objective Quality Assessment for Color-to-Gray Image Conversion", total: 13 pages.

Kaiyu Yue et al., "Compact Generalized Non-local Network",Oct. 31, 2018, total: 10 pages.

Xiaolong Wang et al., "Non-local Neural Networks", Jun. 2018, total: 10 pages.

Chen Chen et al.,"Learning to See in the Dark", May 4, 2018, total: 10 pages.

Satoshi Iizuka et al., "Let there be color!: joint end-to-end learning of global and local image priors for automatic image colorization with simultaneous classification", Jul. 2016, total: 11 pages.

Micha l Gharbi et al., "Deep Bilateral Learningfor Real-Time Image Enhancement", Siggraph 2017, total: 2 pages.

Justin Johnson et al., "Perceptual Losses for Real-Time Style Transfer and Super-Resolution", Mar. 27, 2016, total: 17 pages.

Masahiro Mitsuhara et al., "Embedding Human Knowledge in Deep Neural Network via Attention Map", May 9, 2019, total: 10 pages.

PCT Notification of Transmittal of International Search Report and the Written Opinion of the International Searching Authority, or the Declaration for Application No. PCT/EP2019/078332, dated Oct. 18, 2019, 20 pages.

* cited by examiner

Figure 12 (a)
RAW - Input

Figure 12 (b)
RGB - Output

TRAINED ARTIFICIAL INTELLIGENCE MODEL FOR RAW TO RGB IMAGE TRANSFORMATION

CROSS-REFERENCE TO RELATED APPLICATIONS

This application is a continuation of International Application No. PCT/EP2019/078332, filed on Oct. 18, 2019. The disclosures of the aforementioned application are hereby incorporated by reference in its entirety.

TECHNICAL FIELD

This disclosure relates to digital photography, in particular to transforming raw data collected by an image sensor into a high quality RGB image.

BACKGROUND

The transformation of raw data collected by an image sensor into a high quality RGB image naturally performs denoising, demosaicing, high dynamic range compression, and colorization. These operations are traditionally performed as part of an image signal processing (ISP) pipeline. ISP pipelines are effective and have evolved considerably with advances in digital signal processing, and more recently, artificial intelligence (AI). However, modern ISP pipelines have become complex, relying on many stages of processing. Any errors at an early stage in the pipeline will affect processing in later stages.

Particularly in low light scenes, the raw to RGB transformation is very challenging, due to the low signal to noise ratio (SNR). In such settings, noise heavily corrupts the data, rendering noise removal, dynamic range compression and color estimation a difficult problem.

Traditionally, an ISP relies on a complex pipeline of sequential steps, based on standard signal processing methods. The ISP pipeline requires i) tuning of a large number of exposed parameters and ii) leveraging detailed prior knowledge and assumptions on the noise distribution as well as the camera sensor, which can break down when assumptions do not hold.

Recently, deep learning methods based on convolutional neural networks (CNNs) implemented as a single raw to RGB transformation have outperformed traditional ISPs that perform multiple stages of processing (for example, demosaicing, denoising and color enhancement). Using a single CNN mitigates noise amplification and error accumulation. This is particularly true in scenes with extremely low illumination (for example, 1 lux illumination), such as that described in Chen et al., "Learning to See in the Dark", Proceedings of CVPR 2018, p. 3291-3300. Nonetheless, traditional and AI-based ISP approaches can produce images containing artifacts, unfaithful colors and oversmooth details, especially in the case of low signal to noise ratio signals, such as those acquired in severely limited illumination (for example, moonlight) or short exposure (ideally at video rate).

Figure 1:
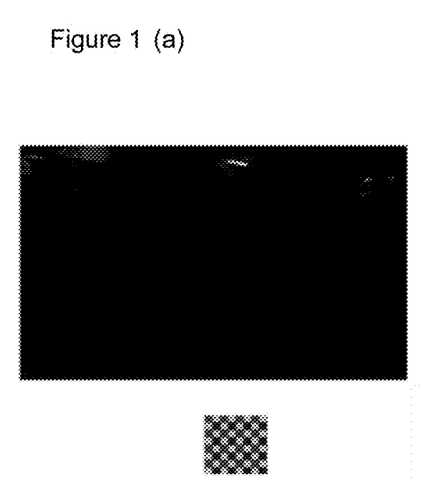
FIG. 1(a) shows a typical short exposure raw image captured from a camera in a low light (approximately 1 lux). Data is captured on a Bayer pattern forming a mosaic of red, green, and blue pixels depicted in the second row.
FIG. 1(b) shows the result using a traditional ISP.
In FIG. 1(c), the result using the method of Chen et al., which relies on deep learning, is shown.

Examples can be seen in FIGS. 1(a)-(c) which illustrate the raw to RGB transformation in low light imaging (from Chen et al., 2018). FIG. 1(a) shows a typical short exposure raw image captured from a camera in a low light (approximately 1 lux). The image appears dark due to the short exposure and a limited amount of light reaching the imaging sensor. Data is captured on a Bayer pattern forming a mosaic of red, green and blue pixels depicted in the second row. In FIG. 1(b), using a traditional ISP, one can transform the raw data into a conventional image by applying a number of operations including denoising, demosaicing, brightness transformation and color mapping. However, residual noise remains and colors are inaccurate. FIG. 1(c) shows the result obtained using the method of Chen et al., which relies on deep learning. This method transforms the raw input to an RGB output using a single convolutional neural network, achieving better noise reduction and color reconstruction. The image is brighter and colors are more vivid than when a traditional ISP is used. Despite the improvement, the image suffers from poor image colors and recovery of details.

Therefore, traditional methods may fail to generate good quality RGB images in low light, and AI-based solutions have limited quality in terms of noise level, quality of detail, and color estimation.

It is desirable to develop an improved method of transforming raw images to RGB images that overcomes these problems.

SUMMARY OF EXAMPLE EMBODIMENTS

According to one aspect there is provided an image processor comprising a plurality of processing modules configured to transform a raw image into an output image, the modules comprising a first module and a second module, each of which implements a respective trained artificial intelligence model, wherein: the first module is configured to implement an image transformation operation that recovers luminance from the raw image; and the second module is configured to implement an image transformation operation that recovers chrominance from the raw image. The image transformation operation implemented by the first module may not recover chrominance from the raw image. The image transformation operation implemented by the second module may not recover luminance from the raw image.

The image processor therefore separately addresses luminance and color recovery from the raw image. This may result in improved image quality. The raw image may be a low light image (i.e. an image captured in low light conditions, for example, of the order of approximately 0.01 to 10 lux illumination). Particularly in low light or SNR conditions, the image processor may produce images with better noise reduction, better detail, and more faithful color compared to a traditional ISP and state-of-the-art deep learning techniques.

The raw image may be in a first color space and the output image may be in a second color space different to the first color space. The use of color space transformations to separately address the luminance and color recovery from the raw image may result in improved image quality.

The raw image may be in an RGB color space and the output image may be in an LAB color space. This may allow contributions related to luminance and color to be more easily separated.

The first module may be configured to output image data in the L channel and the second module may be configured to output image data in the A and B channels. Separately addressing the luminance and color recovery from the raw image in an LAB color space may result in improved image quality.

The image processor may be further configured to transform the output image to an RGB color space. Therefore, the image may be converted to an RGB color space once luminance and color recovery have been addressed in a different color space.

The image transformation operation implemented by the first module may be performed in dependence on spatial correlations in information extracted from the raw image and/or the image transformation operation implemented by the second module may be performed in dependence on correlations in information extracted from characteristics of the raw image. The luminance module may perform its operation in dependence on a spatial self-similarity measure. The color module may perform its operation in dependence on a channel-wise similarity measure. The use of self-similarities may result in improved image quality.

The respective artificial intelligence models may be respective neural networks. This may be a convenient implementation.

The image transformation operation implemented by the second module may be performed in dependence on an intermediate or final state of the neural network that implements the image transformation operation implemented by the first module. The operations implemented by the luminance module and the color module may therefore be linked, so that luminance features of the image assist with colorization.

The neural networks may each comprise a self-attention mechanism, each self-attention mechanism being configured to determine correlations in information extracted from the raw image. This may allow spatial and color self-similarity measures to be determined for the raw image.

The first module may be configured to determine spatial correlations in information extracted from the raw image and the image transformation operation implemented by the second module may be performed in dependence on said spatial correlations. The image processor may therefore fuse information extracted from image luminance and colors to create a mutual guidance based on the two tasks, yielding a coherent representation of the image.

According to a second aspect there is provided a method for transforming a raw image into an output image at an image processor comprising a plurality of modules, the modules comprising a first module and a second module, each of which implements a respective trained artificial intelligence model, the method comprising: implementing an image transformation operation at the first module that recovers luminance from the raw image; and implementing an image transformation operation at the second module that recovers chrominance from the raw image. The image transformation operation implemented by the first module may not recover chrominance from the raw image. The image transformation operation implemented by the second module may not recover luminance from the raw image.

The method therefore separately addresses luminance and color recovery from the raw image. This may result in improved image quality. Particularly in low light or SNR conditions, the method may produce images with better noise reduction, better detail, and more faithful color compared to traditional methods The raw image may be in a first color space and the output image may be in a second color space different to the first color space. The use of color space transformations to separately address the luminance and color recovery from the raw image may result in improved image quality.

The method may further comprise performing the image transformation operation implemented at the first module in dependence on spatial correlations in information extracted from the raw image and/or performing the image transformation operation implemented at the second module in dependence on correlations in information extracted from characteristics of the raw image. The luminance module may perform its operation in dependence on a spatial self-similarity measure. The color module may perform its operation in dependence on a channel-wise similarity measure. This may result in improved image quality.

The respective artificial intelligence models may be respective neural networks. This may be a convenient implementation.

The method may further comprise performing the image transformation operation implemented at the second module in dependence on an intermediate or final state of the neural network that implements the image transformation operation implemented at the first module. The operations implemented by each module may therefore be linked, so that luminance features of the image assist with colorization.

The method may further comprise determining spatial correlations in information extracted from the raw image at the first module and performing the image transformation operation implemented at the second module in dependence on said spatial correlations. The method may therefore fuse information extracted from image luminance and colors to create a mutual guidance based on the two tasks, yielding a coherent representation of the image.

BRIEF DESCRIPTION OF THE FIGURES

The present disclosure will now be described by way of example with reference to the accompanying drawings. In the drawings:

FIGS. 1(a) to 1(c) show examples of raw to RGB transformation in low light imaging (from Chen et al., "Learning to See in the Dark", Proceedings of CVPR 2018, p. 3291-3300).

FIGS. 12(*a*)-(*b*) show an example of results obtained using the method described herein.

FIG. 12(*a*) shows the raw input, and FIG. 12(*b*) shows the RGB output produced.

FIGS. 13(*a*)-(*c*) shows a further example of results obtain using the method described herein.

FIG. 13(*a*) shows a ground truth long exposure image for comparison to the results using the method of Chen et al. in FIG. 13(*b*) and the method described herein in FIG. 13(*c*).

DETAILED DESCRIPTION OF EXAMPLE EMBODIMENTS

The present disclosure concerns an AI-based ISP pipeline that can transform raw image sensor data into a high quality RGB image.

In particular, an image processor according to some example embodiments comprises a luminance module, which is an AI-based ISP module dedicated to recovering luminance (grayscale image representing image brightness, texture and detail), and a color (or chrominance) module, which is an AI-based ISP module dedicated to recovering faithful image colors.

The image processor may advantageously use color space transformations to separately address the luminance and color recovery from the raw image. Furthermore, the image processor may link the luminance and color modules, so that luminance features of the image assist with colorization.

Figure 2:
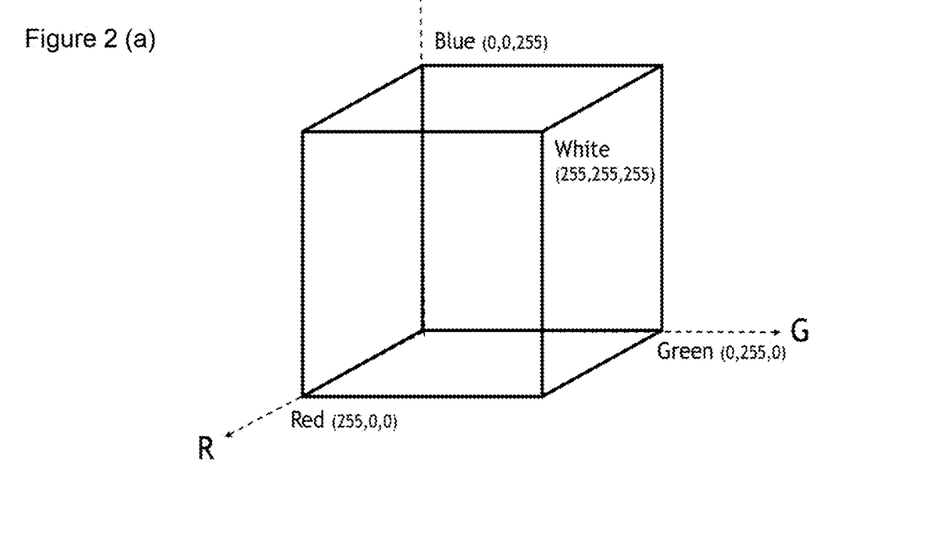
FIG. 2(a) shows a representation of an RGB colorspace.
FIG. 2(b) shows two original RGB images and their components.

FIG. 2 (*a*) shows a representation of an RGB colorspace. The RGB color model is an additive color model in which red, green and blue light are added together in varying amounts to produce a broad array of colors. The color is expressed as an RGB triplet (r,g,b), each component of which can vary from zero to a defined maximum value. If all the components are at zero the result is black; if all are at maximum, the result is the brightest representable white. FIG. 2(*b*) shows two original RGB images and their r,g,b components. In the RGB colorspace, information related to luminance and colors are mixed, making the raw to RGB transformation more complex.

In order to decouple the original raw to RGB problem into its subcomponents, a preferred implementation of the proposed ISP pipeline operates in a different colorspace, where contributions related to luminance and color are more easily separated. A suitable colorspace for this application is an LAB color space, though other suitable color spaces may be used.

Figure 3A:
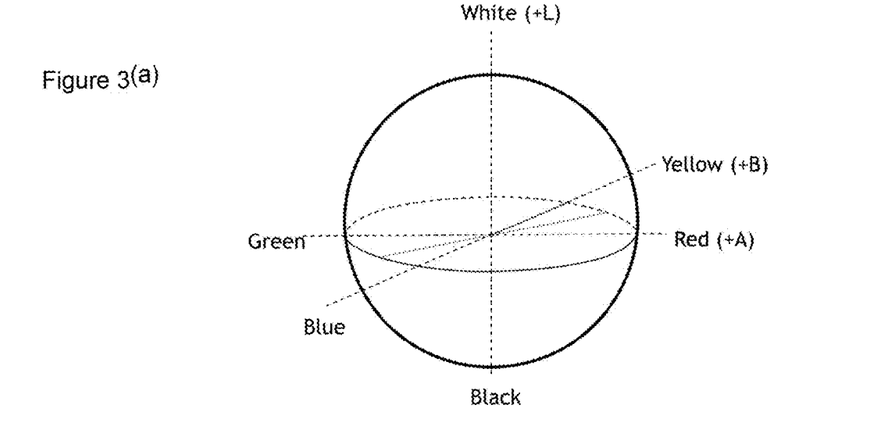
FIG. 3(a) depicts a representation of the CIELab color space (also abbreviated as simply "LAB" color space) which expresses color as a sum of three values: one luminance channel (L) and two color-opponent channels (A and B).
Figure 3B:
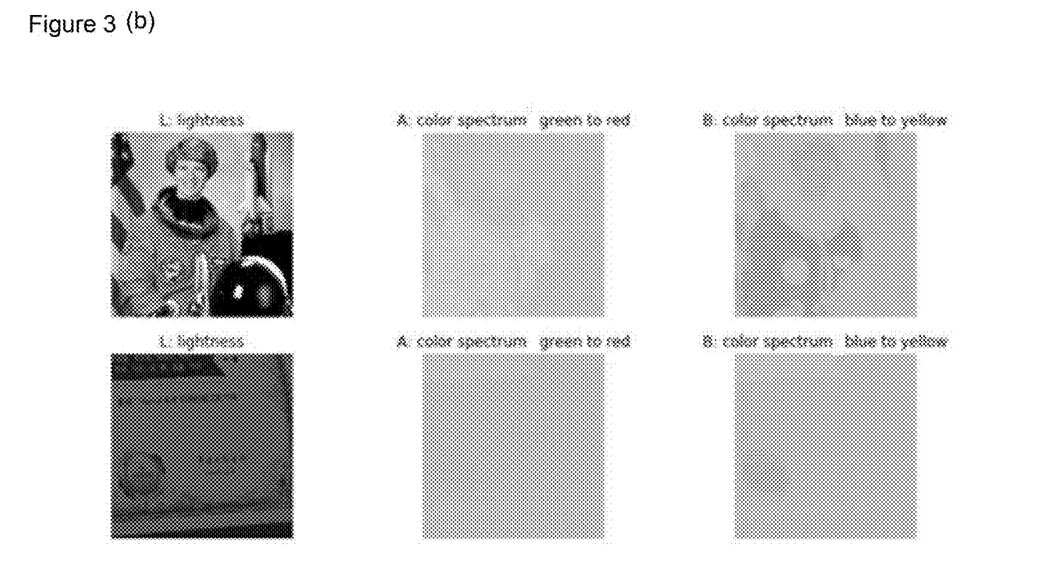
FIG. 3(b) visualizes the three L, A, B components for the same sample images depicted in FIG. 2(b).

FIG. 3(*a*) depicts a representation of the CIELab color space (also abbreviated as simply "LAB" color space) which expresses color as a sum of three values: one luminance channel (L) and two color-opponent channels (A and B). The L channel encodes the image grayscale brightness and the AB channels encode the color. The luminance channel expresses the ranges for the lightness from black (0) to white (100). The A ranges from green (−) to red (+), and B from blue (−) to yellow (+). Unlike the RGB color model, the LAB color model is designed to approximate human vision. In this model, the color differences which one perceives correspond to Euclidian distances in CIELab. FIG. 3(*b*) visualizes the three L,A,B components for the same sample images depicted in FIG. 2(*b*).

The system described herein has dedicated modules to estimate the luminance (L channel) and color (AB channels) from the raw data.

Figure 4:
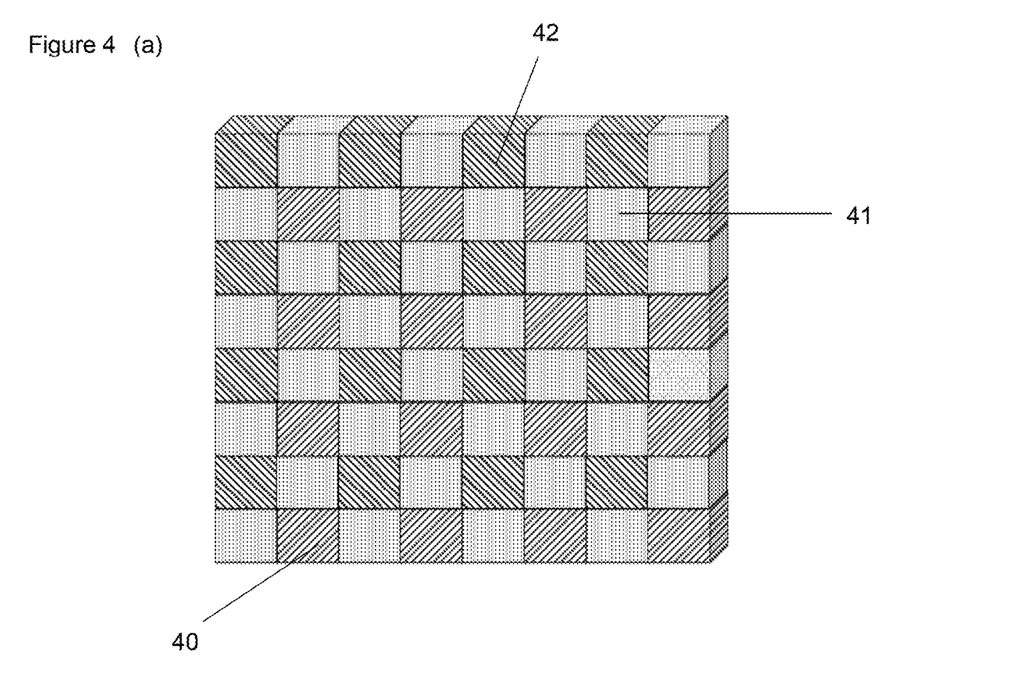
FIG. 4(a) shows the standard Bayer pattern color filter array on the sensor. At each pixel, either a blue, green, or red color is acquired.
FIG. 4(b) illustrates how the mosaiced image is packed into four color channels representing the R, G1, G2, and B colors. In the packed form, the spatial resolution of each color channel is half the original mosaiced image resolution.

In one non-limiting embodiment, the raw data passed as input to the image processor is an image formed using a color filter array (CFA) that captures light of specific colors at each pixel, for example, using the well-known Bayer pattern shown in FIG. 4(*a*). This pattern has a recurring 2×2 mosaic that is tiled across the image. At each pixel, either a red 40, green 41 or blue color 42 is acquired. Often the raw data captured has a large dynamic range, for example, 10 bit data which can represent 1024 different levels at each red, green or blue color. An image captured in this format is said to be mosaiced.

As will be described in more detail below, in a preferred embodiment, both of the above mentioned modules of the image processor use convolutional neural networks (CNNs) to process the mosaiced image. A CNN learns a collection of filters, which are applied to the image through convolution. The convolution is designed to be spatially invariant, meaning the convolution has the same effect when applied to any location in the image. A potential problem however with applying convolutions on a mosaiced image is that the convolutions are no longer spatially invariant as a result of the CFA. For example, when the filter is centered on a blue pixel, it may have a different effect than when centered on a red pixel. A simple way to address this issue is to pack the data into like-color channels, each of which can then be processed in the CNN using spatially invariant convolutions. In FIG. 4(*b*), the mosaiced image is packed into four color channels representing the R, G1, G2, and B colors, 43, 44, 45 and 46 respectively. In the packed form, the spatial resolution of each color channel is half the original mosaiced image resolution. Both networks of the system receive as input a packed RAW packet.

Figure 5:
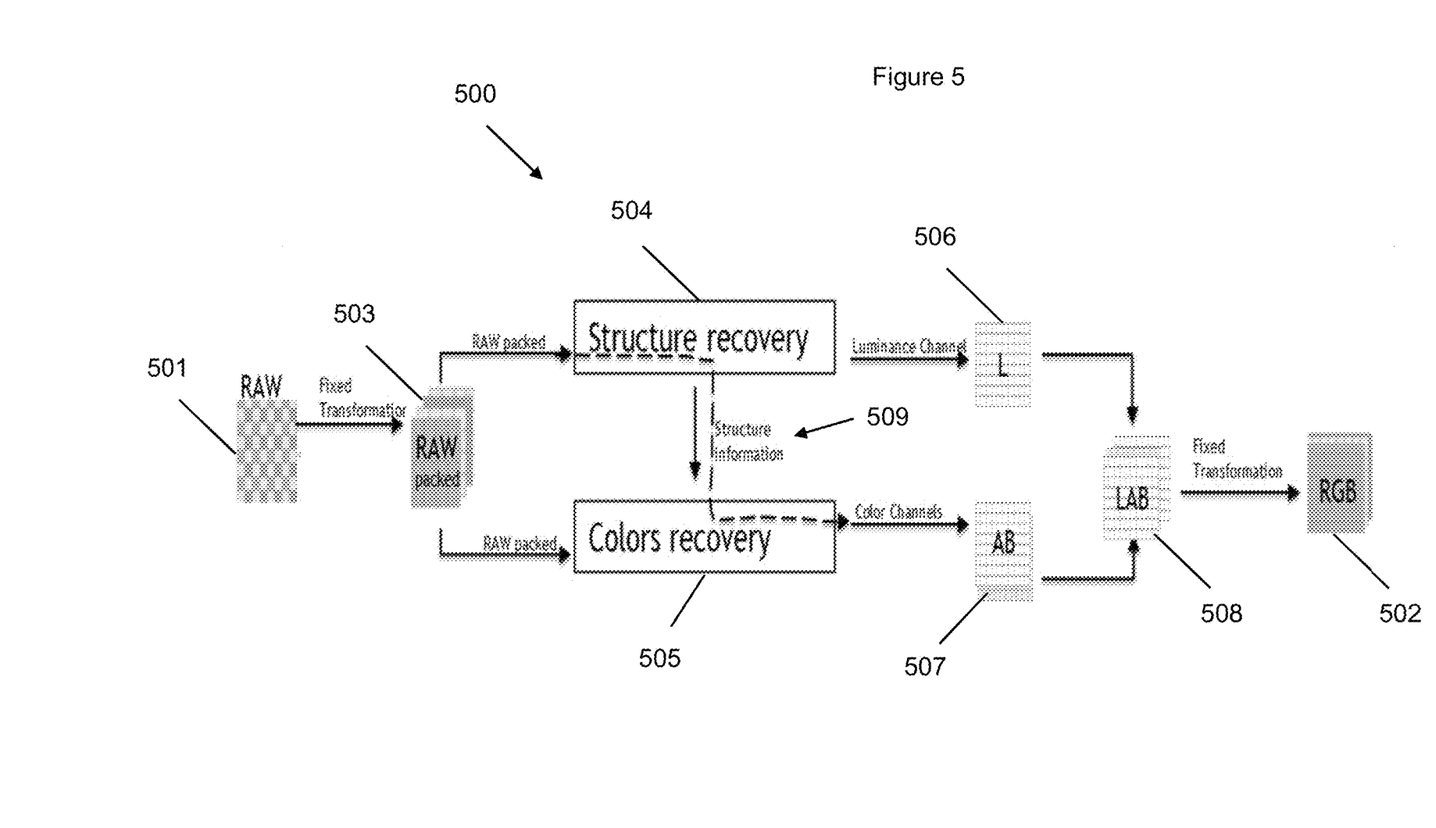
FIG. 5 illustrates an example of the high-level structure of an image processing system for transforming a raw image to an RGB image. The proposed deep learning approach applies two subnetworks based on the LAB color space.

FIG. 5 illustrates an example of the high-level structure of an image processing system 500 for transforming a raw image 501 to an RGB image 502. The pipeline takes the raw sensor input 501, which is a matrix of height×width×one channel of size H×W×1 sampled on a color filter array (Bayer pattern). The raw image is packed, as shown at 503. The deep learning approach applies two subnetworks based on the LAB color space, shown at 504 and 505. The CNN subnetwork 504 reconstructs the luminance (L) relating to image grayscale brightness, representing texture, edges and image structure including high frequency detail. The input to this module is the raw H×W×1 data and the output is H×W×1 data which gives the luminance channel (L), shown at 506. The CNN subnetwork 505 estimates the image chrominance (AB) relating to image color. The input to this module is the raw H×W×1 data and the output is H×W×2 data corresponding to the two chrominance channels (AB), shown at 507.

The outputs of the two subnetworks are combined to produce a three-channel output 508 in the LAB colorspace of size H×W×3, which is then converted to the RGB domain based on a fixed transformation to give RGB image 502.

The processes performed by the two modules are linked together, as depicted by the dotted arrow indicated at 509. Through the linking mechanism, luminance information is used to produce higher quality color output, as will be described in more detail below.

The proposed method therefore uses two parallel and linked modules (i.e. two separate CNNs in some embodiments) to extract different information from the same raw signal. The CNNs extract a high-dimensional image representation from the raw input data, where each region of the input is mapped into a point/position, described by a certain number of filter-activations or channels.

Intuitively, most images exhibit self-similarity, where a local part of an image is highly similar (or correlated) to another part of the image. For example, an image of a brick wall will likely contain many repeated visual patterns resulting from repeated bricks in the image. Taking advantage of this self-similarity may be important for denoising and other image processing operations, since each instance of a visual pattern may have a different noise pattern but similar underlying structure. By taking advantage of the self-similarity, even over a long distance in an image, an algorithm may better infer the content of the image despite the noise.

This concept has been exploited in many image processing methods including BM3D Dabov, Kostadin et al. "Image denoising by sparse 3D transform-domain collaborative filtering". IEEE Transactions on Image Processing, 16 (8): 2007.

In statistics and related fields, auto correlation is a common measure of similarity between different parts of the input. More generally, a similarity function is a real-valued function that quantifies the similarity between two signals. Although no single definition of a similarity measure exists, usually such measures are in some sense the inverse of distance metrics: they take on large values for similar signals and either zero or a negative value for very dissimilar objects. In computer vision, a self-similarity measure can be used to summarize relations between different parts of the input image and models dependencies among non-neighboring regions. The same self-similarity measure can describe different things depending on the representation.

A preferred embodiment of the present system uses two different and complementary versions of a deep learning based self-similarity mechanism (SSM) when processing the image, namely spatial and color self-similarities. Examples of spatial and color self-similarities can be seen in Mitsuhara, Masahiro, et al., "Embedding Human Knowledge in Deep Neural Network via Attention Map." arXiv preprint arXiv:1905.03540 (2019) and Johnson, J., Alahi, A., & Fei-Fei, L. (2016, October), "Perceptual losses for real-time style transfer and super-resolution", European conference on computer vision (pp. 694-711).

In the luminance module, the system relies on a spatial self-similarity measure. This measure integrates spatial interactions among different image patches and is computed using position-wise second order statistics of the input signal. The image transformation operation implemented by the luminance module is therefore performed in dependence on spatial correlations in information extracted from the raw image. In this way, the luminance module is enriched with the representation of similarity information among all possible position pairs in the image. The relationships are considered as a salient and dense representation of the image content.

The color module leverages the relationship between color-components by computing a channel-wise similarity measure. This measure is found by computing second order statistics of the input signal. As this module focusses on image color estimation, its input is enriched with the representation of similarity among all possible feature channel pairs. Those relationships represent a global description of the "style" (for example, pattern and color-scheme) of the input image since they are not related to any specific image position but instead describe interaction between different CNN's filter's activations. For example, if the image contains a lake with clear sky, filters related to smooth areas and blue colors will have both high activation values and high correlation. The image transformation operation implemented by the color module is therefore performed in dependence on correlations in information extracted from characteristics of the raw image.

As shown by the arrow 509 in FIG. 5, the system links the luminance and color estimation subproblems through a fusion mechanism. Independently in each module, information regarding image luminance and colors is extracted from the same input raw image. Then, by incorporating an explicit self-attention mechanism (for example, a Non Local Block) to fuse information extracted from the image luminance and colors, the method described herein creates a mutual guidance based on the two tasks, yielding a coherent representation of the image.

Figure 6:
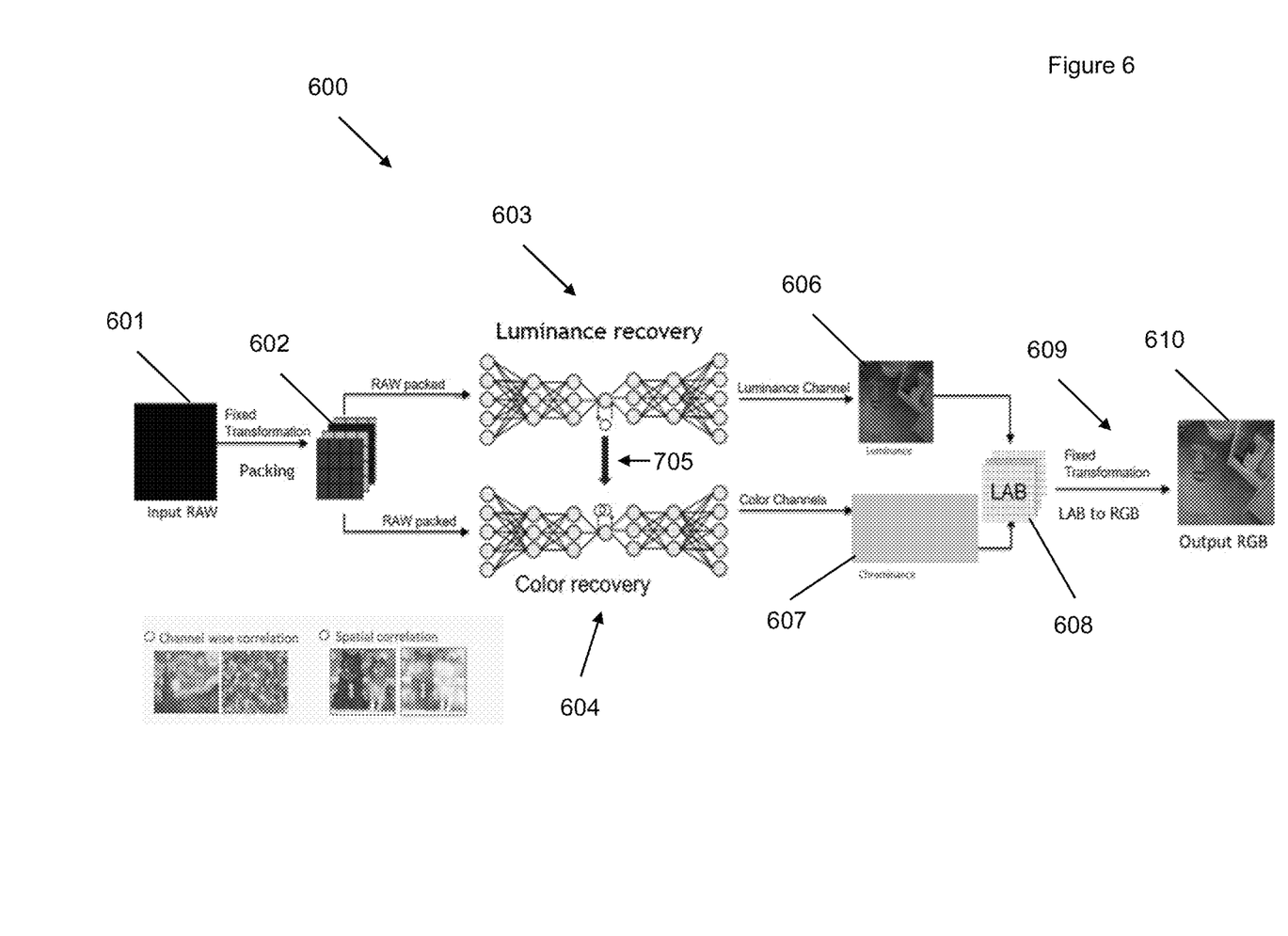
FIG. 6 illustrates a preferred embodiment of the image processor.

FIG. 6 provides a high-level representation of a preferred, but non-limiting, embodiment of an image processing system 600 where spatial and channel-wise correlations are exploited.

The raw input data 601 is packed, as shown at 602, and proceeds to the stages of luminance recovery 603 and color recovery 604. The luminance recovery 603 and the color recovery 604 branches are convolutional neural networks (CNNs), and the linking mechanism 605 employs self-similarity to leverage correlations, or similarities, across spatial and channel dimensions. This way, different parts of the image can support each other to make a more accurate estimation of color information in the color recovery branch 604. The two CNNs 603 and 604 are linked so that luminance features at the bottleneck of the structure recovery module are transferred to the bottleneck of the color recovery module, which may improve the color estimation based on image luminance content.

The output channels L, shown at 606, and A,B, shown at 607, are concatenated together to produce a H,W,3 matrix 608. A fixed transformation 609 can be applied to convert the LAB channels to the RGB domain to give the final image 610. The CNNs each comprise a self-attention mechanism which determines correlations in information extracted from the raw image (spatial correlations in the luminance module and channel-wise correlations in the color module). One preferred embodiment illustrating the use of a Non Local Block (as described in Wang, X., Girshick, R., Gupta, A., and He, K, "Non-local neural networks", Proceedings of the IEEE Conference on Computer Vision and Pattern Recognition, 2018 (pp. 7794-7803)) as the self-attention mechanism will now be described.

Figure 7A:
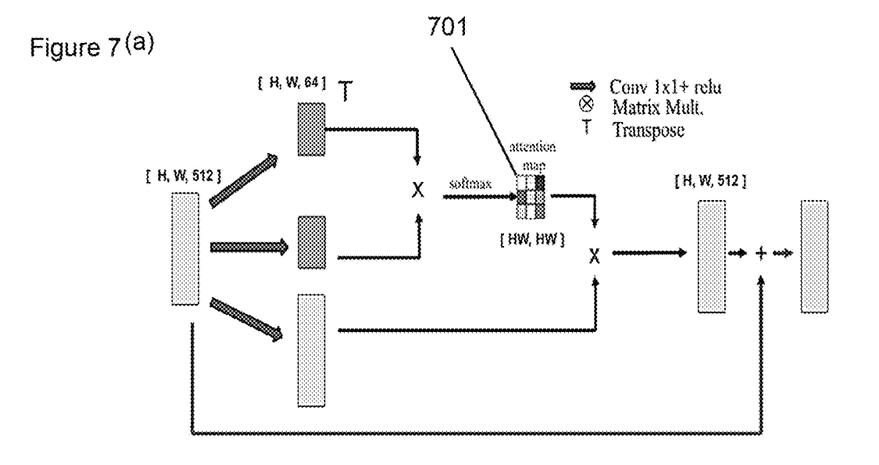
FIG. 7(a) illustrates a Non Local Block that computes spatial self-similarity used in the luminance module.
Figure 7B:
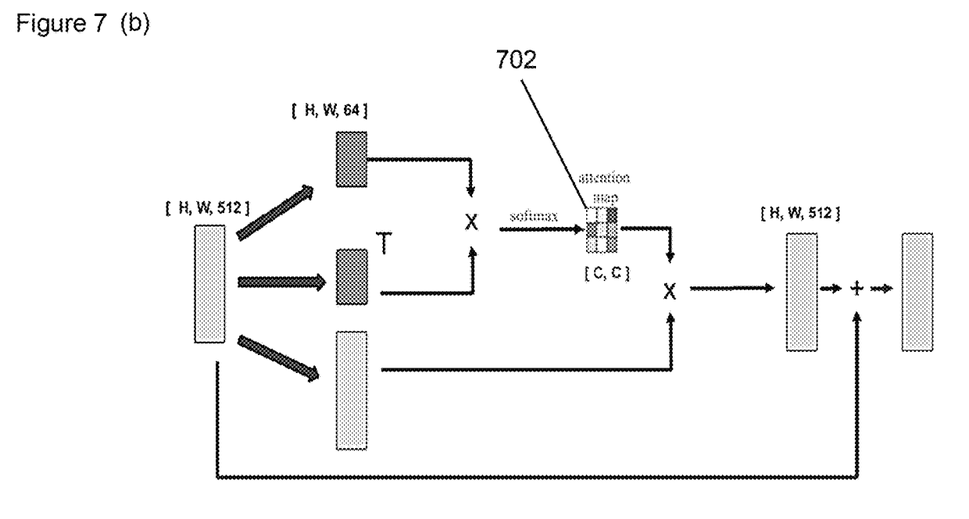
FIG. 7(b) illustrates a Non Local Block that computes channel-wise self-similarity used in the color module.

Convolutional operations are building blocks that process one local neighborhood at a time. Therefore, long-range dependencies can only be captured when these operations are applied repeatedly. This comes with several limitations, such as computational inefficiency and optimization difficulties. As depicted in FIGS. 7(*a*) and 7(*b*), the Non Local Block is a self-similarity module which computes the response of an element in a sequence by attending to all other elements and taking their weighted average in an embedding space. The method processes all possible pairs and computes a similarity score for each of them, producing an attention map. The multiplication with a representation of the original input image integrates this similarity information in the output features. Afterwards, the output is summed with the original input features through a residual connection to enhance the image representation.

FIGS. 7(*a*) and 7(*b*) highlight the difference between the spatial and the channel-wise Non Local Blocks used by the networks in the luminance and color modules respectively. The luminance attention map, shown at 701 in FIG. 7(*a*), computes the similarity between spatial positions (i.e. position×position) while the color attention map, shown at 702 in FIG. 7(*b*), focuses on similarity among all possible image-channel pairs.

Figure 8:
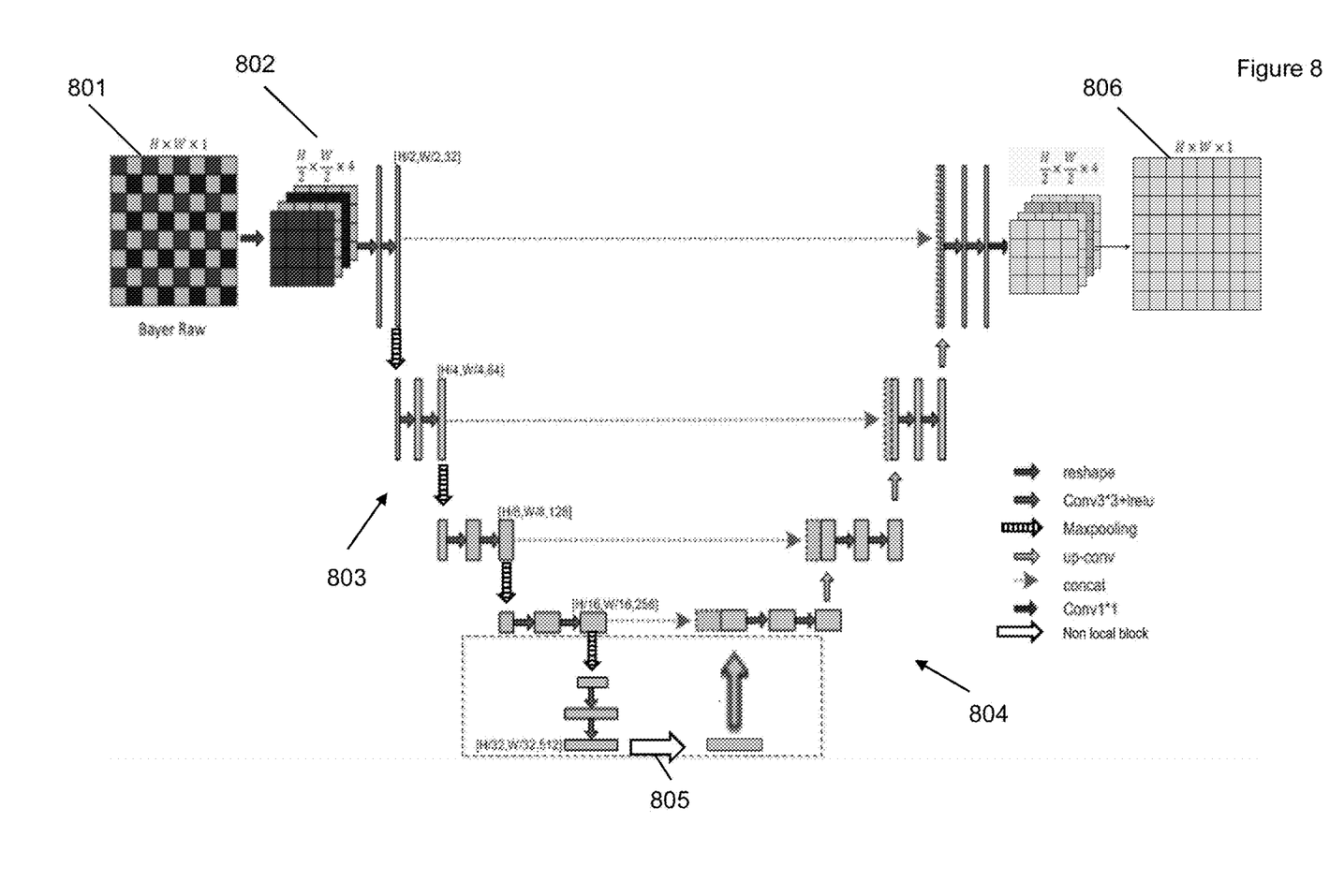
FIG. 8 shows a schematic of the luminance module, used to estimate the luminance (L channel) from the raw data.

A preferred embodiment of the CNN design of the luminance module is illustrated in FIG. 8.

This network takes a raw single channel input 801, which is then packed, shown at 802, and processed with a Unet, as described in Ronneberger, Olaf et al., "U-Net: Convolutional Networks for Biomedical Image Segmentation," Medical Image Computing and Computer-Assisted Intervention (MICCAI), Springer, LNCS, Vol. 9351: 234-241, 2015. This is a "fully convolutional" network that uses an encoder-decoder architecture with skip connections. The encoder and the decoder parts of the network are shown generally at 803 and 804 respectively.

The encoder part 803 processes the raw input with five consecutive layers. Each layer applies to its input two banks of 3×3 convolutional filters (together with a ReLU activation function) and one "Max Pooling" operation. The first convolution increases the number of filters (i.e. channels) by a factor of two. The Max Pooling operation reduces the spatial image resolution by a factor of two (i.e. from H, W, C to H/2, W/2, C). The image is processed at multiple scales and the network adapts to different frequency content. This produces output channels that capture features inherent in the data and relevant to the luminance estimation task.

Between the encoder 803 and the decoder 804 parts of the network, the Non Local Block (depicted as arrow 805 at the bottom of the Unet in FIG. 8) integrates information about position (i.e. spatial) self-similarity. The Non Local Block 805 used in the luminance module computes spatial position-wise correlations. It takes as input the encoder-features (H/32, W/32, 512) and produce as output a matrix with the same dimensionality.

The decoder part 804 processes the output of the Non Local Block 805 with four consecutive layers of two banks of 3×3 convolutional filters and a Transposed Convolution operation. The Transposed Convolution is an upsampling layer which increases the spatial resolution by a factor of two in each dimension (width and height) and decreases the number of filters by a factor of two. The input to each layer is a concatenation of i) the high resolution features from the encoding part related to the same spatial resolution and ii) the output of the previous decoding layer (i.e. spatially upsampled features). The two subsequent convolutions learn to assemble a more precise output based on the concatenated input.

During training, the network learns the convolutional filters. This can be done using training pairs, each comprising an input raw and a reference image, which is used as ground truth (GT). Initially, the convolutional filters are set to random values. The mosaiced image is input into the network, and the network regresses an output image. The difference between the regressed output image and the GT image forms an error, which is then back-propagated through the network from the output to the input though gradients. The weights of the network are then updated to reduce the error. The training process iterates using a large collection of images until the network weights converge.

Once the network is trained, it can be applied to raw input data to recover its Luminance channel, shown at 806.

Figure 9:
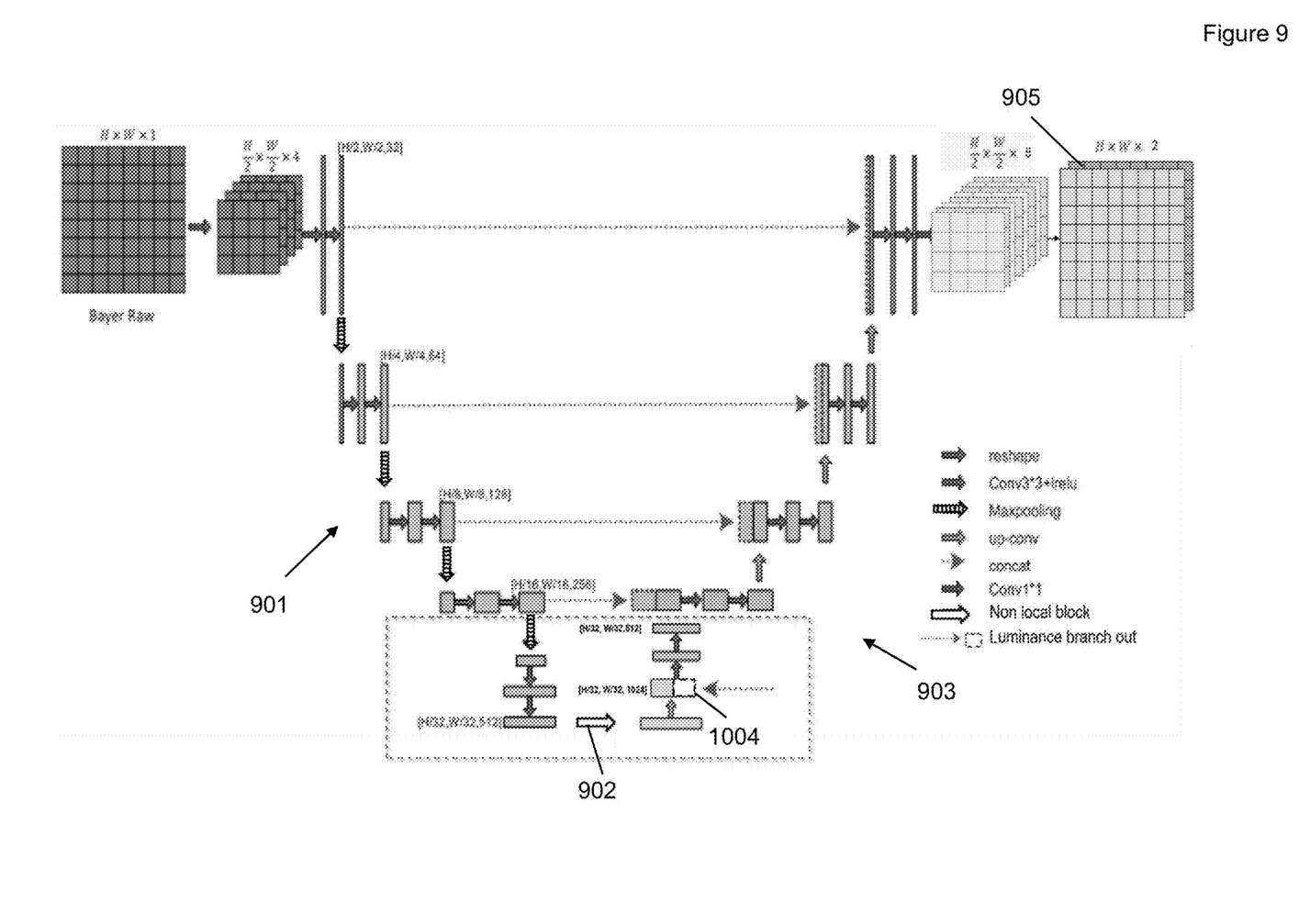
FIG. 9 shows a schematic of the color module, used to estimate the color (AB channels) from the raw data.

A preferred embodiment of the CNN design of the color module is illustrated in FIG. 9. Similarly to the luminance module, the color module is implemented with a Unet architecture of a five-layer encoder with downsampling, shown generally at 901, a Non Local Block 902 and a five-layer decoder with upsampling, shown generally at 903.

The Non Local Block 902 used in the color module computes channel-wise correlations. It takes as input the encoder-features (H/32, W/32, 512) and produces as output a matrix with the same dimensionality. The output of the Non Local Block 902 is concatenated with the output of the Non Local Block 805 of the luminance module (i.e. with the information coming from the structure recovery stage), producing a (H/32, W/32, 1024) matrix. Therefore, the image transformation operation implemented by the color module is performed in dependence on an intermediate state of the neural network that implements the image transformation operation implemented by the luminance module. The two subsequent convolutions learn to assemble a more precise output based on the concatenated input.

During training, the color module learns the weights used in the convolutional filters and upsampling using back-propagation, as described earlier. The training process iterates using a large collection of images until the network weights converge. Once the network is trained, it can be applied to raw input data to produce the A and B color channels, shown at 905.

Therefore, in a preferred implementation, the AI-based ISP pipeline that transforms raw image sensor data to a high quality RGB image is in the form of a single deep neural network which comprises two separate, yet linked, modules that operate on different aspects of the image.

Figure 10:
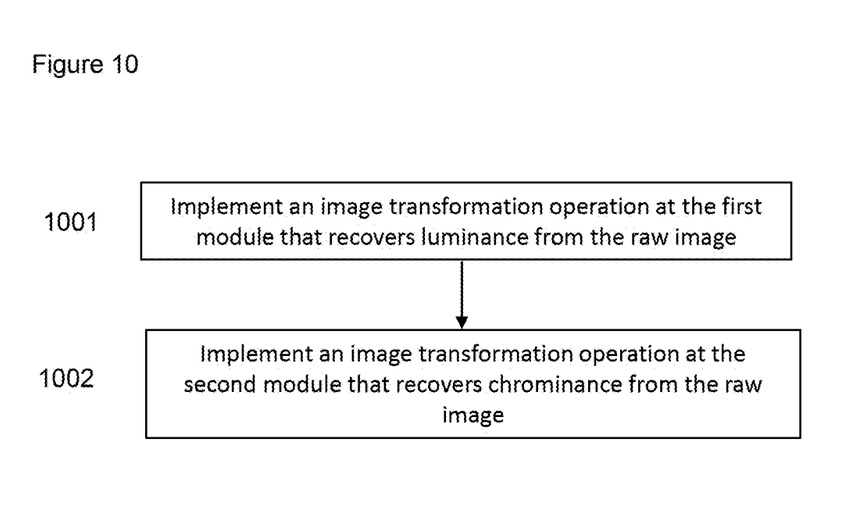
FIG. 10 shows a method for refining a raw image captured by a camera in an image processor.

FIG. 10 summarizes a method for transforming a raw image captured by a camera in an image processor in accordance with the present disclosure. As described above, the image processor comprises a first module and a second module, each of which implements a respective trained artificial intelligence model. The method comprises, at step 1001, implementing an image transformation operation at the first module that recovers luminance from the raw image and at step 1002, implementing an image transformation operation at the second module that recovers chrominance from the raw image.

Figure 11:
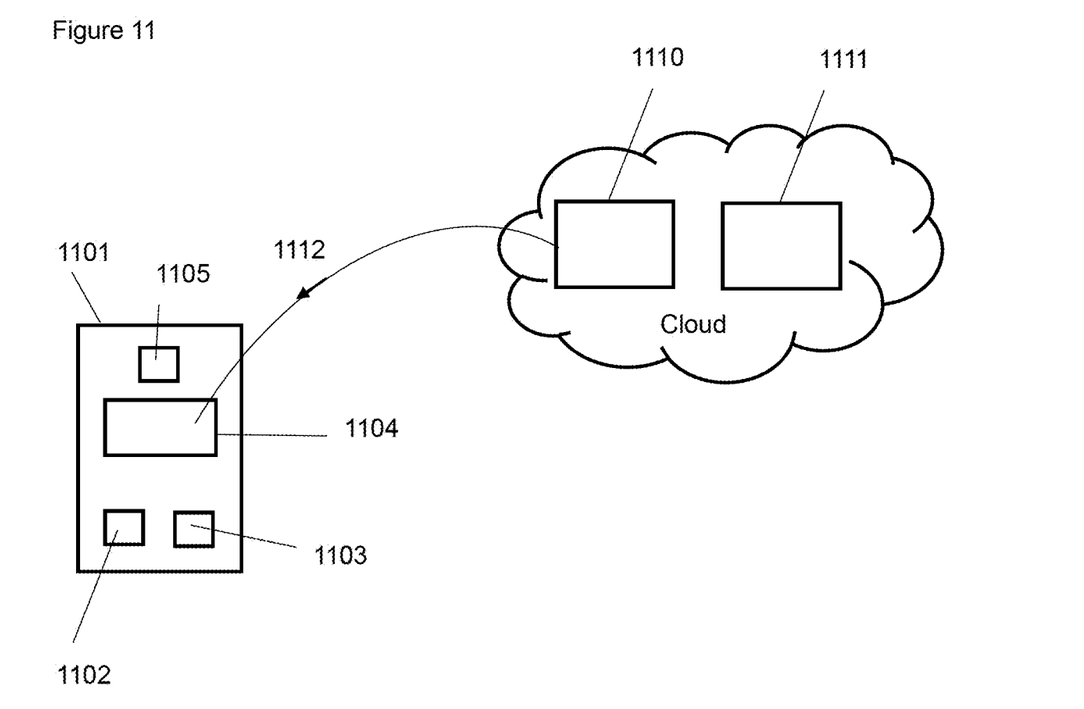
FIG. 11 shows an example of a camera configured to implement the image processor and method described herein to process images taken by an image sensor in the camera.

FIG. 11 shows an example of a camera configured to implement the image processor to process images taken by an image sensor 1102 in the camera 1101. Such a camera 1101 typically includes some onboard processing capability. This could be provided by the processor 1104. The processor 1104 could also be used for the essential functions of the device. The camera typically also comprises a memory 1103.

The transceiver 1105 is capable of communicating over a network with other entities 1110, 1111. Those entities may be physically remote from the camera 1101. The network may be a publicly accessible network such as the internet. The entities 1110, 1111 may be based in the cloud. In one example, entity 1110 is a computing entity and entity 1111 is a command and control entity. These entities are logical entities. In practice they may each be provided by one or more physical devices such as servers and datastores, and the functions of two or more of the entities may be provided by a single physical device. Each physical device implementing an entity comprises a processor and a memory. The devices may also comprise a transceiver for transmitting and receiving data to and from the transceiver 1105 of camera 1101. The memory stores in a non-transient way code that is executable by the processor to implement the respective entity in the manner described herein.

The command and control entity 1111 may train the artificial intelligence models used in each module of the system. This is typically a computationally intensive task, even though the resulting model may be efficiently described, so it may be efficient for the development of the algorithm to be performed in the cloud, where it can be anticipated that significant energy and computing resource is available. It can be anticipated that this is more efficient than forming such a model at a typical camera.

In one implementation, once the deep learning algorithms have been developed in the cloud, the command and control entity can automatically form a corresponding model and cause it to be transmitted to the relevant camera device. In this example, the system is implemented at the camera 1101 by processor 1104.

In another possible implementation, an image may be captured by the camera sensor 1102 and the image data may be sent by the transceiver 1105 to the cloud for processing in the system. The resulting target image could then be sent back to the camera 1101, as shown at 1112 in FIG. 11.

Therefore, the method may be deployed in multiple ways, for example in the cloud, on the device, or alternatively in dedicated hardware. As indicated above, the cloud facility could perform training to develop new algorithms or refine existing ones. Depending on the compute capability near to the data corpus, the training could either be undertaken close to the source data, or could be undertaken in the cloud, e.g. using an inference engine. The system may also be implemented at the camera, in a dedicated piece of hardware, or in the cloud.

Figure 12:
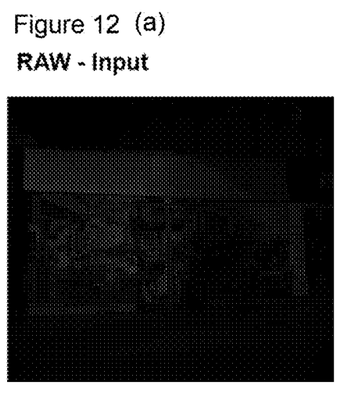
Figure 13:
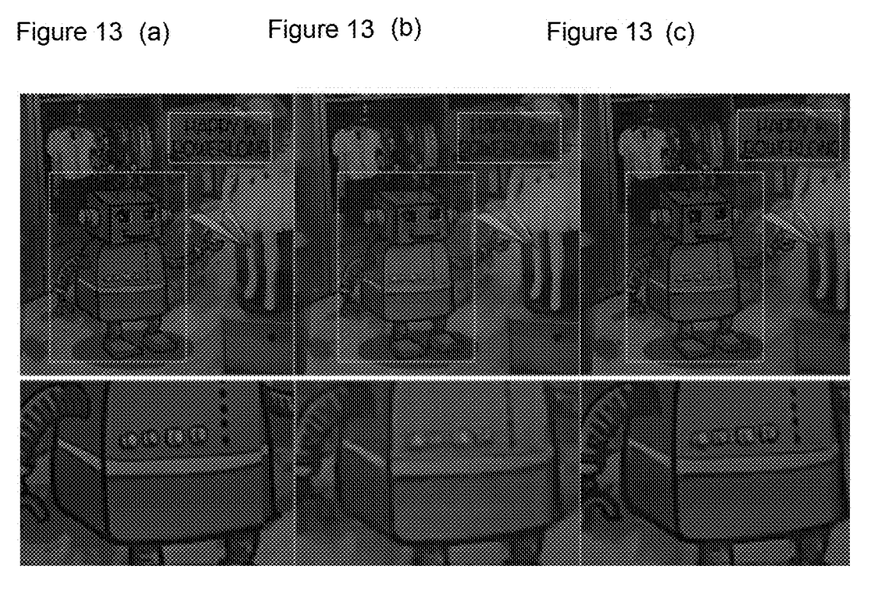

FIG. 12 shows an example of results obtained using the method described herein. FIG. 12(*a*) shows the raw input, and FIG. 12(*b*) shows the RGB output produced. FIG. 13 shows a comparison of results obtained for an area of the raw image of FIG. 12(*a*) using different methods. FIG. 13(*a*) shows a ground truth long exposure image for comparison. FIG. 13(*b*) shows the state-of-the-art deep learning method (Chen et al., 2018). Although the image has good denoising, the image suffers from blurry details and less faithful colors compared to the ground truth. In FIG. 13(*c*), an image obtained using the proposed method is shown, which estimates sharper edges and more realistic colors compared to the baseline.

Therefore, the method described herein may result in improved image quality. Particularly in low light or SNR conditions, the proposed method may produce images with better noise reduction, better detail, and more faithful color compared to a traditional ISP and state-of-the-art deep learning techniques.

In another implementation, a computer code for transforming a raw image into an output image is provided. The program code, when executed by a computer, causes the computer to implement a first trained artificial intelligence model for performing an image transformation that recovers luminance from the raw image and a second trained artificial intelligence model for performing an image transformation that recovers chrominance from the raw image. The operations of the method described above may be implemented in the program code.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present disclosure may consist of any such individual feature or combination of features. In view of the foregoing description it will be evident to a person skilled in the art that various modifications may be made within the scope of the invention.

The invention claimed is:

1. An image processor comprising a plurality of processing modules configured to transform a raw image into an output image, the modules comprising a first module and a second module, each of which implements a respective trained artificial intelligence model, wherein:
the first module is configured to implement an image transformation operation that, using a first trained artificial intelligence model, recovers luminance from the raw image; and
the second module is configured to implement an image transformation operation that, using a second trained artificial intelligence model, recovers chrominance from the raw image,
wherein the image transformation operation implemented by the first module is performed in dependence on spatial correlations in information extracted from the raw image and/or the image transformation operation implemented by the second module is performed in dependence on correlations in information extracted from characteristics of the raw image.

2. The image processor according to claim 1, wherein the raw image is in a first color space and the output image is in a second color space different to the first color space.

3. The image processor according to claim 2, wherein the raw image is in an RGB color space and the output image is in an CIELab (LAB) color space.

4. The image processor according to claim 3, wherein the first module is configured to output image data in the luminance (L) channel of the LAB color space and the second module is configured to output image data in the color component (A and B) channels of the LAB color space.

5. The image processor according to claim 1, wherein the image processor is further configured to transform the output image to an RGB color space.

6. The image processor according to claim 1, wherein the respective artificial intelligence models are respective neural networks.

7. The image processor according to claim 6, wherein the image transformation operation implemented by the second module is performed in dependence on an intermediate or final state of a neural network that implements the image transformation operation implemented by the first module.

8. The image processor according to claim 6, wherein the respective neural networks each comprise a self-attention mechanism, each self-attention mechanism being configured to determine correlations in information extracted from the raw image.

9. The image processor according to claim 1, wherein the first module is further configured to determine the spatial correlations in the information extracted from the raw image and wherein the image transformation operation implemented by the second module is performed in dependence on said determined spatial correlations.

10. A method for transforming a raw image into an output image at an image processor comprising a first module and a second module, each of which implements a respective trained artificial intelligence model, the method comprising:
implementing an image transformation operation at the first module that, using a first trained artificial intelligence model, recovers luminance from the raw image;

implementing an image transformation operation at the second module that, using a second trained artificial intelligence model, recovers chrominance from the raw image; and performing the image transformation operation implemented at the first module in dependence on spatial correlations in information extracted from the raw image and/or performing the image transformation operation implemented at the second module in dependence on correlations in information extracted from characteristics of the raw image.

11. The method according to claim 10, wherein the raw image is in a first color space and the output image is in a second color space different to the first color space.

12. The method according to claim 10, wherein the respective artificial intelligence models are respective neural networks.

13. The method according to claim 12, the method further comprising performing the image transformation operation implemented at the second module in dependence on an intermediate or final state of the respective neural network that implements the image transformation operation implemented at the first module.

14. The method according to claim 10, further comprising determining the spatial correlations in the information extracted from the raw image at the first module and performing the image transformation operation implemented at the second module in dependence on said determined spatial correlations.

15. A non-transitory readable storage medium storing computer code for transforming a raw image into an output image, wherein the computer code, when executed by a computer, causes the computer to perform operations comprising:

performing, using a first trained artificial intelligence model, an image transformation that recovers luminance from the raw image; and performing, using a second trained artificial intelligence model, an image transformation that recovers chrominance from the raw image, wherein the image transformation operation performed using the first trained artificial intelligence model is performed in dependence on spatial correlations in information extracted from the raw image and/or the image transformation operation performed using the second trained artificial intelligence model is performed in dependence on correlations in information extracted from characteristics of the raw image.

16. The non-transitory readable storage medium according to claim 15, wherein the respective trained artificial intelligence models are respective neural networks.

17. The non-transitory readable storage medium according to claim 16, wherein the image transformation operation performed using the second trained artificial intelligence model is performed in dependence on an intermediate or final state of a neural network that implements the image transformation operation performed using the first trained artificial intelligence model.

18. The non-transitory readable storage medium according to claim 16, wherein the respective neural networks each comprise a self-attention mechanism, each self-attention mechanism being configured to determine correlations in information extracted from the raw image.

19. The non-transitory readable storage medium according to claim 15, wherein the computer code, when executed by the computer, causes the computer further to determine the spatial correlations in the information extracted from the raw image and wherein the image transformation operation implemented by the second trained artificial intelligence model is performed in dependence on said determined spatial correlations.

20. The method according to claim 12, wherein the respective neural networks each comprise a self-attention mechanism, each self-attention mechanism being configured to determine correlations in information extracted from the raw image.

* * * * *